United States Patent [19]
Brkovic

[11] Patent Number: 5,917,312
[45] Date of Patent: Jun. 29, 1999

[54] SYSTEM AND METHOD FOR VOLTAGE POSITIONING A REGULATOR AND REGULATOR EMPLOYING THE SAME

[75] Inventor: Milivoje Slobodan Brkovic, Plano, Tex.

[73] Assignee: Lucent Technologies Inc., Murray Hill, N.J.

[21] Appl. No.: 09/098,281

[22] Filed: Jun. 16, 1998

[51] Int. Cl.$^6$ ........................................................ G05F 1/56
[52] U.S. Cl. ............................................. 323/282; 323/285
[58] Field of Search ..................................... 323/266, 280, 323/282, 285, 351, 352, 275, 277; 363/17, 20, 21, 98

[56] References Cited

U.S. PATENT DOCUMENTS

| | | | |
|---|---|---|---|
| 3,982,173 | 9/1976 | Berry et al. ................................ | 323/236 |
| 4,146,832 | 3/1979 | McConnell ................................ | 323/285 |
| 5,404,094 | 4/1995 | Green et al. ............................... | 323/282 |
| 5,420,495 | 5/1995 | Hingorani .................................. | 323/218 |
| 5,666,043 | 9/1997 | Henry et al. .............................. | 323/277 |
| 5,680,035 | 10/1997 | Haim et al. ............................... | 323/277 |
| 5,838,145 | 11/1998 | Poon et al. ................................ | 323/266 |

*Primary Examiner*—Adolf Deneke Berhane

[57] ABSTRACT

A system for, and method of, voltage positioning a regulator and a regulator employing the system or the method. The regulator has an input coupled to a switching network and an output coupled to a load. In one embodiment, the voltage positioning system, includes a current sensor, coupled to the output, that senses an output current of the regulator and generates a proportional voltage. The system further includes a voltage sensor, coupled to the load, that senses a load voltage and the proportional voltage. The system still further includes a controller, coupled to the voltage sensor, that generates a signal to control the switching network as a function of the load voltage and the proportional voltage.

24 Claims, 3 Drawing Sheets

5,917,312

SYSTEM AND METHOD FOR VOLTAGE POSITIONING A REGULATOR AND REGULATOR EMPLOYING THE SAME

TECHNICAL FIELD OF THE INVENTION

The present invention is directed, in general, to power conversion and, more specifically, to a system and method for voltage positioning a regulator and a regulator employing the same.

BACKGROUND OF THE INVENTION

Power electronic systems commonly employ one or more power electronic regulators that utilize power devices controlled by integrated circuits. The regulator is the basic module of the power electronic system. In general, a power electronic regulator controls and shapes an electrical input with a known magnitude and frequency into an electrical output with a different magnitude and frequency. The power flow through the regulators may be reversible, thus interchanging the roles of input and output. Specifically, DC/DC regulators convert one DC voltage level into another. In an AC/DC conversion, a given AC voltage is rectified and transformed into a desired DC voltage level.

There are many ways to classify regulators used in power electronics. These include classification by type of device used, function of the regulator, how the switching device in the regulator is switched and so on. Unfortunately, no well-defined categories based on these criteria are possible because of numerous exceptions to the standards.

One common regulator configuration is known as a linear regulator. These types of regulators linearly manipulate a given input voltage to produce a desired output voltage. In essence, such regulators can be simplistically modeled as a variable scaling resistor across which a portion of the input voltage is dissipated. The remaining voltage is then usable at the regulator output.

Another configuration is called a switching or switched-mode regulator. These regulators contain controllable switches which are turned on and off at frequencies that are high compared to a line frequency. By way of the switches, the regulator will deliver the full input voltage to the output for a period less than the entire duty cycle of the switches. An example of such a regulator could require a 5V output to be derived from a 10V input voltage. For a duty cycle equaling 1 $\mu$sec, the switches may be switched to deliver the full 10V for half of the time, 0.5 $\mu$sec. Thus if 10V is applied for half of the 1 $\mu$sec period, the voltage for the entire period would be 5V. Then by employing a smoothing network, commonly a conventional LC circuit, the output is smoothed to an overall 5V output for the entire period.

Typical regulators produce an output voltage in a specified regulated range. This range or region is usually defined as the specific output voltage plus or minus a tolerable range voltage.

In the past, when a load was coupled to a regulator, a drop in the regulator's output voltage would result, commonly forcing that output voltage outside of its predetermined regulated range. Not only was this drop unacceptable since it deprived the load of necessary voltage, it could also result in malfunction of the load circuitry.

To combat this problem, designers began employing a system for positioning the output voltage of the regulator within a given operating range (commonly referred to as voltage positioning) in such a fashion as to compensate for the drop encountered when a load was brought online. Additionally, voltage positioning also must counteract disturbances encountered such as input voltage fluctuations, load current changes, switching ripples, stray transients, and variations in components tolerances or temperatures. Thus, the goal would be to position the output voltage at its highest range value at no load and lowest range value at maximum load.

Initially the solution to this problem entailed anticipating the connection of the load and calculating the associated voltage drop of the regulator output. Once estimated, the regulator output voltage would be adjusted to a higher output voltage such that when the load is coupled thereto and the resulting voltage drop occurs, the output voltage is still within the regulated range.

Determining how to adjust the regulator output voltage to operate within the imposed limits posed the primary problem in this system. Usually, a designer, assuming a constant output load and known internal regulator voltages, can devise a circuit which operates with set voltage limits. Known internal voltages can be calculated for known values as functions of the output load voltages. Thus, simple existing circuits are designed by employing simple static elements that increase the duty cycle of the regulator during given times.

Unfortunately, in practice, it has been found that the assumption of a fixed load is not entirely correct. While acceptable as a first attempt, such assumptions did not cover the full range of voltage responses from the load. In reality, load output voltages are not entirely fixed. Even in loads which have a known stable output voltage, the actual voltage characteristic may contain some variation due to unanticipated impedances.

Accordingly, what is needed in the art is a system and method of driving the output of the regulator as a function of the actual output voltage.

SUMMARY OF THE INVENTION

To address the above-discussed deficiencies of the prior art, the present invention provides a system for, and method of, voltage positioning a regulator and a regulator employing the system or the method. The regulator has an input coupled to a switching network and an output coupled to a load.

In one embodiment, the voltage positioning system, includes a current sensor, coupled to the output, that senses an output current of the regulator and generates a proportional voltage. The system further includes a voltage sensor, coupled to the load, that senses a load voltage and the proportional voltage. The system still further includes a controller, coupled to the voltage sensor, that generates a signal to control the switching network as a function of the load voltage and the proportional voltage.

The present invention therefore introduces the broad concept of controlling a regulator based not only upon output current, but also upon the voltage at the load. If the load is remote, as occurs in many applications, the load voltage takes into account variations in load as well as variations in impedance in conductors leading from the power converter to the load. Voltage positioning for the regulator therefore becomes more accurate, leading to improved converter regulation.

In one embodiment of the present invention, the current sensor includes an inline resistor coupled in series with the output. The current sensor further includes an operational amplifier coupled to the inline resistor and having noninverting and inverting inputs. The current sensor still further includes first and second scaling resistors coupled to the noninverting and inverting inputs, respectively. The current sensor then generates a voltage proportional to current through the inline resistor. Those skilled in the art will realize, however, that other devices may be employed to sense a power converter's output current and develop a proportional voltage.

In one embodiment of the present invention, the switching network includes first and second switches and the current sensor includes first and second current transformers coupled to the first and second switches, respectively. In this embodiment, the current transformers sense a current in the regulator and current sensor develops a voltage proportional to the output current. Again, other current sensing devices are well within the broad scope of the present invention.

In one embodiment of the present invention, the voltage sensor includes a voltage divider network coupled to the current sensor and the controller. In a related, but alternative embodiment the voltage sensor includes a plurality of summing resistors coupled to the load and the current sensor and an operational amplifier coupled to the plurality of summing resistors and the controller. For reasons that will become more apparent, the voltage divider network develops a signal for the controller based on the load voltage and proportional voltage. The voltage divider, however, is not necessary to the broad scope of the present invention.

In one embodiment of the present invention, the load is coupled to the output via a pair of conductors having corresponding impedances associated therewith. The load may be located a distance from the output of the regulator and the impedances in the line should be accounted for by the system for voltage positioning the regulator.

In one embodiment of the present invention, the switching network includes a switch selected from the group consisting of a controllable switch and a diode. The switches included in the switching network may be passive switching devices or controllable switches such as field-effect transistors or bipolar junction transistors.

In one embodiment of the present invention, the regulator is a selected from the group consisting of a linear regulator and a switched-mode regulator. Any regulator is well within the broad scope of the present invention. For instance, the regulation of a switched-mode converter will be improved by employing the principles of the present invention thereto.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
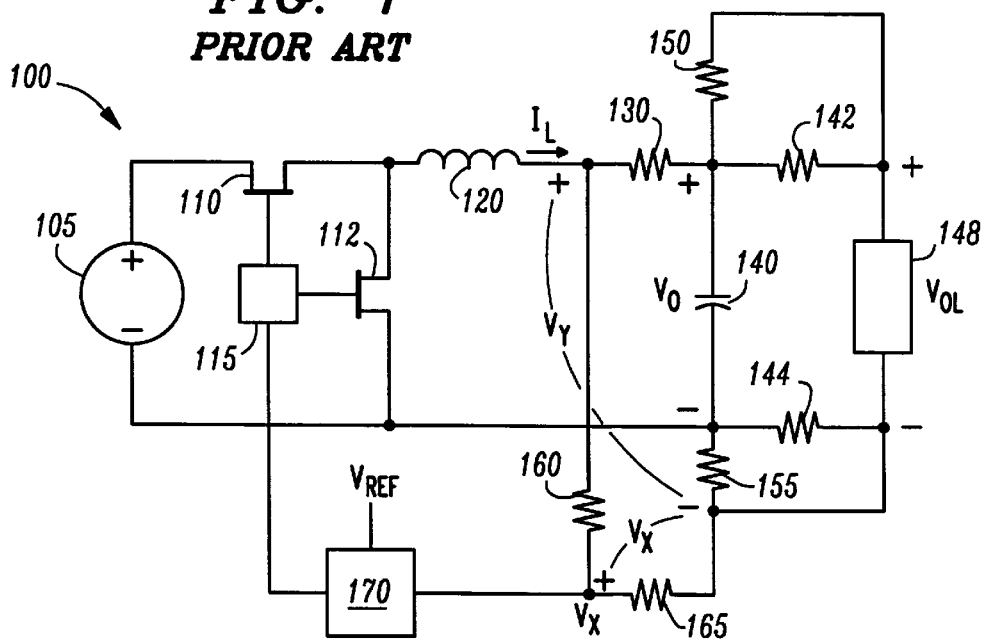
FIG. 1 illustrates a schematic diagrams of a prior art power supply.

Referring initially to FIG. 1, illustrated is a schematic diagrams of a prior art power supply. The power supply 100 receives DC power from a DC source 105. The DC source 105 is coupled to a regulator that includes a first switch 110, a second switch 112 and a driver circuit 115 for driving the switches 110, 112. An output inductor 120 is coupled to the first switch 110 and an output capacitor 140 is coupled to the output of the regulator. A regulator output voltage $V_O$ is measured across output capacitor 140. A conventional feedback controller 170 is coupled to the regulator and delivers control signals to the driver circuit 115.

A load voltage $V_{OL}$ is measured across a resistive load 148 that is coupled across the output capacitor 140. The lines between the output capacitor 140 and the load 148 contain first and second impedances 142, 144. Further coupled in parallel with the first and second impedances 142, 144, are first and second sense resistors 150, 155.

The first and second sense resistor 150, 155 are employed to provide output voltage sensing in cases where a load is not connected to the first and second sense resistors 150, 155. Otherwise, the feedback controller 170 would detect zero voltage and force the regulator to operate at a maximum duty cycle, resulting in an over-voltage condition at the output. Additionally, the sense resistors 150, 155 allow for deferential voltage measurement across the load 148.

A sensing resistor 130, used in voltage positioning, is coupled between the output inductor 120 and the output capacitor 140. A first feedback resistor 160 is coupled between the sensing resistor 130 and the feedback controller circuit 170. A second feedback resistor 165 is coupled between the second sense resistor 155 and the feedback controller 170. A first node $V_x$ is formed between the first and second feedback resistors 160, 165 and the feedback controller 170. A measurement voltage $V_y$ is measured between the output inductor 120 and the second sense resistor 155. This measurement voltage $V_y$ is analogous to the load voltage $V_{OL}$.

In this prior art power supply 100, a designer, assuming a constant DC resistance of impedances 142, 144 and known internal regulator voltages, designs a circuit that operates within set voltage limits. Unfortunately, the combination of the sensing resistor 130 and the feedback resistors 160, 165 function in combination to position the output voltage for only a constant output load voltage by increasing the duty cycle of the regulator. This prior art configuration is not usable for supplies where regulation of the load voltage is regulated due to variable resistances of the connection between the load and regulator.

One problem with this configuration is that the voltage at the first node $V_x$ is dependent upon the line impedances 142, 144. The relationship between voltage at the first node $V_x$ and the line impedances 142, 144 can be shown in the following equations, assuming that the impedances 142, 144 are resistive.

$$V_x = V_y * \frac{R_{165}}{R_{165} + R_{160}}$$

$V_y = V_{130} + V_{142} + V_{ol}$, where $V_{130} = I_o * R_{130}$ and $V_{142} = I_o * R_{142}$ thus, $V_y = I_o(R_{130} + R_{142})$ Assuming $V_{ref} = V_x$ $$V_{ref} = \frac{R_{165}}{R_{165} + R_{160}} * [I_o(R_{130} + R_{142}) + V_{ol}]$$

$V_{ol} = [1 + R_{160}/R_{165}] * V_{ref} - I_o * R_{130} - I_o * R_{142}$  (EQ. 1)

where:
 $V_x$=a voltage at the first node $V_x$.
 $V_y$=a measurement voltage $V_y$.
 $V_{ol}$=an output voltage of the remote load 148.
 $R_{160}$=resistance of first feedback resistor 160 (Ω).
 $R_{165}$=resistance of second feedback resistor 165 (Ω).
 $R_{130}$=resistance of sensing resistor 130 (Ω).
 $R_{142}$=resistance of first line impedance 142 (Ω).
 $I_o$=output current measured through the first line impedance 142.

Therefore, as shown in the first equation (EQ. 1), in this prior art power supply 100, the voltage at the first node $V_x$ is dependent upon the first impedance 142 within the line connected to the load 148. When employing such a prior art power supply 100, the designer much take into account the existence of unknown line impedances.

Figure 2:
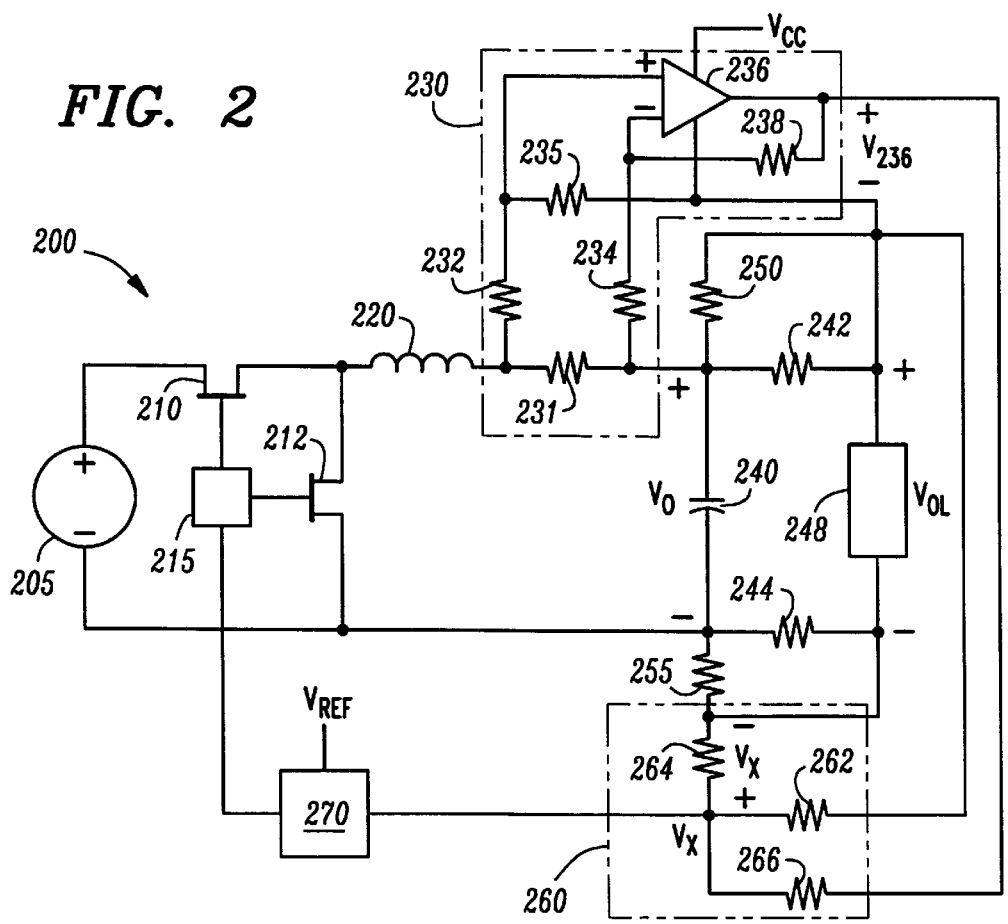
FIG. 2 illustrates a schematic diagram of a switched-mode power supply employing an embodiment of a voltage positioning system constructed according to the principles of the present invention.

Turning now to FIG. 2, illustrated is a schematic diagram of a switched-mode power supply 200 employing an embodiment of a voltage positioning system constructed according to the principles of the present invention. The switched-mode power supply 200 contains a regulator that receives DC power from a DC source 205. The regulator includes a switching network including first and second switches 210, 212 and a driver circuit 215 for driving the switches 210, 212. Finally, an output inductor 220 is coupled to the first switch 210 and an output capacitor 240 (a filter) is coupled across the output of the regulator. A regulator output voltage $V_0$ is measured across output capacitor 240.

A load voltage $V_{OL}$ is measured across a load 248 that is coupled across the output capacitor 240. The conductors (i.e., the lines) between the output capacitor 140 and the load 248 contain first and second impedances 242, 244. Further coupled in parallel with the first and second impedances 242, 244, are first and second sense resistors 250, 255.

The voltage positioning system, including a current sensor 230, a voltage sensor 260 and a controller 270, is coupled to the regulator to provide voltage positioning. The current sensor 230 is coupled to the regulator output and includes a sensing resistor 231 coupled between the output inductor 220 and the output capacitor 240. The current sensor 230 includes a series of resistors and an operational amplifier (op-amp) 236 that interact with the voltage across the sensing resistor 231 as a differential amplifier. The op-amp 236 derives power from a supplied voltage $V_{cc}$ and the positive terminal of the load 248.

First and second scaling resistors 232, 234 are coupled to the sensing resistor 231 and to the noninverting and inverting inputs of op-amp 236, respectively. Further, a third scaling resistor 235 is coupled between the noninverting input of the op-amp 236 and the positive terminal of the load 248, while a feedback resistor 238 is coupled between the output and the inverting input of the op-amp 236 to supply negative feedback.

The feedback resistor 238 combined with the second scaling resistor 234 determine the gain of the op-amp 236. The first scaling resistor 232 and the third scaling resistor 235 are typically selected to have the same values as the second scaling resistor 234 and the feedback resistor 238, respectively, to allow for differential measurements.

The voltage sensor 260 consists of a voltage divider that includes first, second and third voltage resistors 262, 264, 266. The first voltage resistor 262 is coupled between the positive terminal of the load 248 and a first node $V_x$. A second voltage resistor 264 is coupled between the negative terminal of the load 248 and the first node $V_x$. Finally, a third voltage resistor 266 is coupled between the output of the op-amp 236 and the first node $V_x$.

The controller 270 is a conventional controller which is coupled to the voltage sensor 260 at the first node $V_x$. In a preferred embodiment, the controller is a pulse-width modulator (PWM). The controller compares the voltage at the first node $V_x$ to a preselected reference voltage $V_{ref}$ and then generates a control signal that is sent to the driver circuit 215 to drive the switches 210, 212 in the regulator.

In a further embodiment, the op-amp 236 may be assumed to be ideal with an output voltage of 0V. In such a case, the first voltage resistor 262 would not be necessary and therefore no connection would be present between the positive terminal of the load 248 and a first node $V_x$ whatsoever. As a result, the voltage appearing at the first node $V_x$ would be the load voltage $V_{OL}$ plus the output voltage of the op-amp 236.

The second voltage resistor 264 provides differential measurement of the voltage across the load and allows separation of the ground for the controller 270 and the ground for the load 248. Additionally, the second voltage resistor 264 allows adjustment of the no-load output voltage $V_o$, when such is different from the selected reference voltage $V_{ref}$. If $V_{ref} = V_o$ and with properly selected second and third voltage resistors 264, 266 (i.e., 266>>264), the regulated range in which the regulator can operate can be set to a maximum value.

When the output of the op-amp 236 has a non-zero value, even when the voltage across the sensing resistor 231 is zero (no load current), the first voltage resistor 262 will be necessary. The combination of the first and third voltage resistors 262, 266 form a voltage divider for the output voltage of the op-amp 236.

In the case of an ideal op-amp 236, the first voltage resistor 262 will have a zero value and the operation of the circuit can be calculated as follows.

Where $R_{232}=R_{234}$ and $R_{235}=R_{238}$ and $V_{ref}=V_x$, $V_{231}=R_{231}*I_o$ $V_{236}=(R_{231}*I_o)*G_{236}=(1+R_{238}/R_{234})*R_{231}*I_o$ $$V_x = V_{ref} = V_{236} * \frac{R_{266} \| R_{264}}{(R_{266} \| R_{264}) + R_{262}} + V_{ol} * \frac{R_{264}}{R_{264} + (R_{266} \| R_{262})}$$

$V_{ol}=[V_{ref}-V_{236}*(R_{266}\|R_{264}/(R_{266}\|R_{264})+R_{262})]*[1+(R_{266}\|R_{262}/R_{264})]$ (EQ. 2)

Assuming ideal op-amp 236, V236=0V for $I_o$=0 and R264>> (R264, R262), $V_{ol} \approx V_{ref}$
where:

$R_{231}$=resistance of the sensing resistor 231 (Ω).

$G_{236}$=Gain of the op-amp 236 as determined by second scaling resistor 234 and the feedback resistor 238.

$R_{262}$=resistance of the first voltage resistor 262 (Ω).

$R_{264}$=resistance of the second voltage resistor 263 (Ω).

$R_{266}$=resistance of the third voltage resistor 263 (Ω).

$I_o$=output current measured through the output inductor 220.

$R_{266}\|R_{264}=\frac{R_{266}*R_{264}}{R_{266}+R_{264}}$ $R_{266}\|R_{262}=\frac{R_{266}*R_{262}}{R_{266}+R_{262}}$ Therefore, as can be seen in the second equation (EQ. 2), the power supply 200, employing an embodiment constructed according to the principles of the present invention, supplies an output voltage which is not a function of the line impedances 242, 244.

As opposed to the prior art power supply shown in FIG. 1, the designer may employ this circuit without making design concessions for possible unknown line impedances 242, 244.

Figure 3:
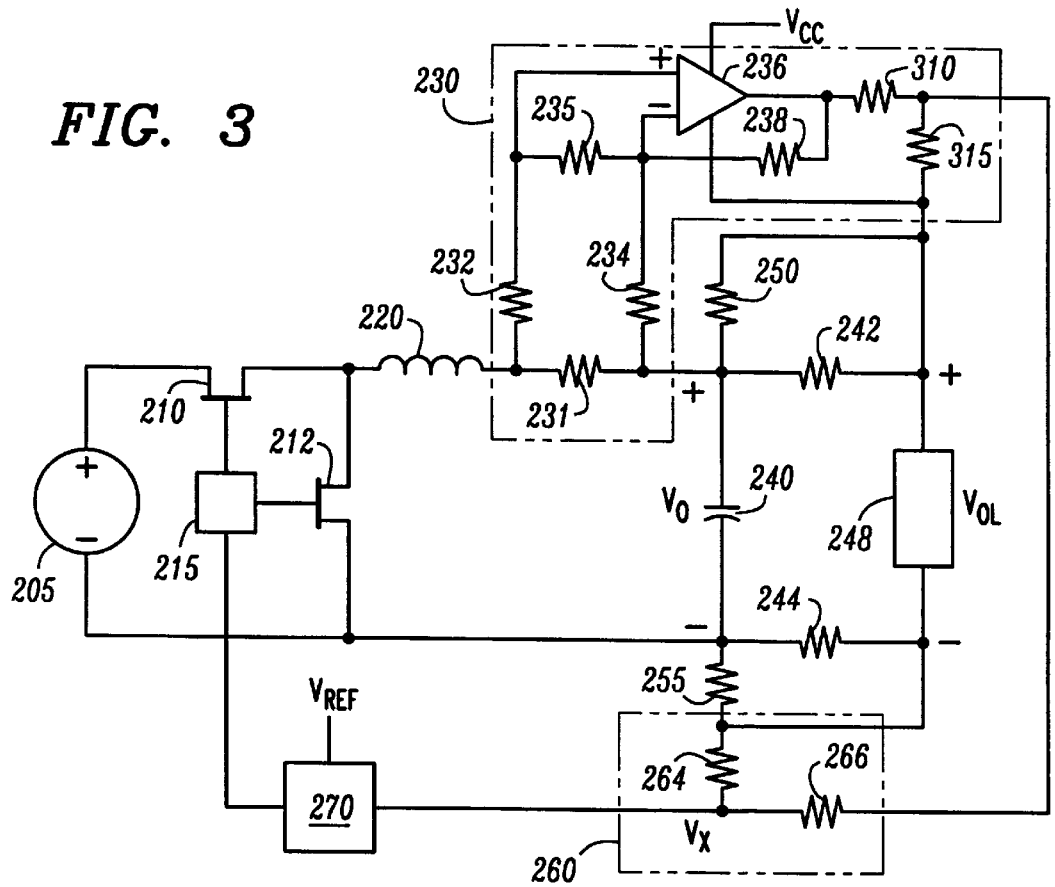
FIG. 3 illustrates a schematic diagram of the regulator of FIG. 2 employing another embodiment of a voltage positioning system constructed according to the principles of the present invention.

Turning now to FIG. 3, illustrated is a schematic diagram of the regulator of FIG. 2 employing another embodiment of a voltage positioning system constructed according to the principles of the present invention. The regulator, current sensor 230, voltage sensor 260 and controller 270 employed in this embodiment are, with some exceptions, analogous to those specified in FIG. 2.

In this embodiment, the current sensor 230 employs first and second output resistors 310, 315 in addition to the components set forth in the previous embodiment. The first output resistor 310 is coupled from the output of the op-amp 236 to the third voltage resistor 266 and the second output resistor 315 is coupled from the first output resistor 310 to the positive terminal of the load 248. Finally, in this embodiment, the voltage sensor 260 does not include the first voltage resistor 262, but still retains the second and third voltage resistors 264, 266.

The first and second output resistor 310, 315 are used to scale the output voltage of the op-amp 236 when its output is a non-zero value and the current through the output inductor 220 is zero. During operation, when the output of the op-amp 236 is too large, the output resistors 310, 315 will scale the output voltage to an acceptable level.

Figure 4:
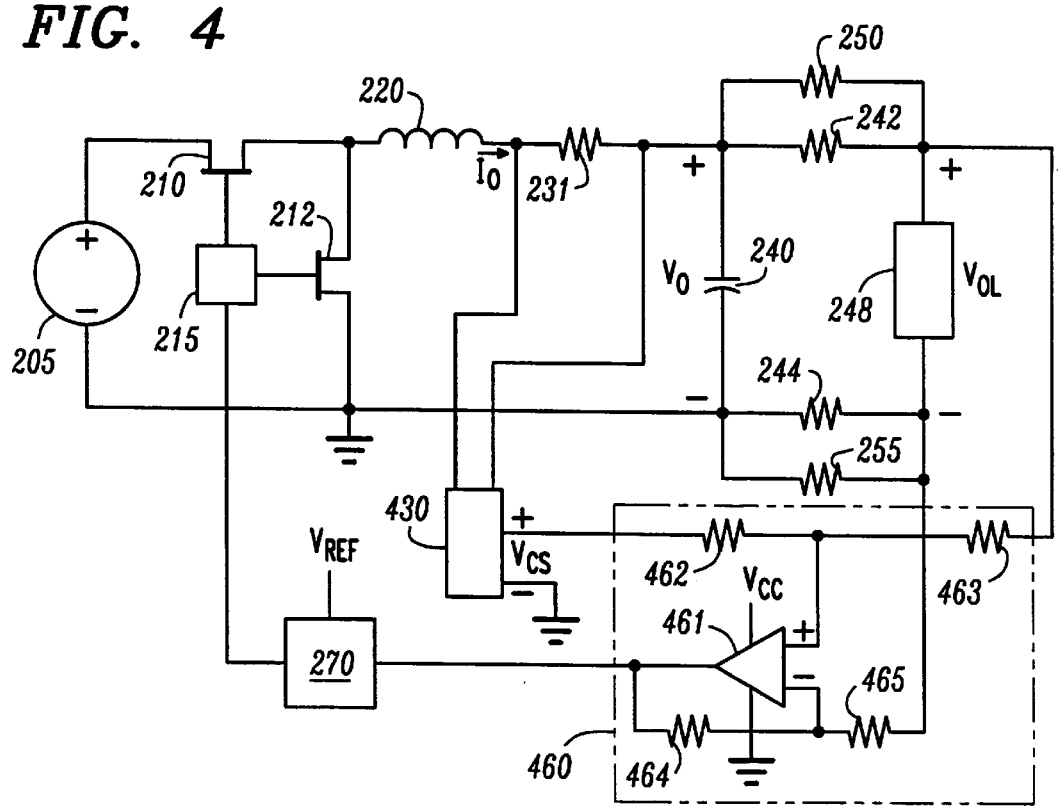
FIG. 4 illustrates a schematic diagram of the regulator of FIG. 2 employing another embodiment of a voltage positioning system constructed according to the principles of the present invention.

FIG. 4 illustrates a schematic diagram of the regulator of FIG. 2 employing another embodiment of a voltage positioning system constructed according to the principles of the present invention. The voltage positioning system employs a current sensor 430 and controller 270 that are, with some exceptions, analogous to those specified in FIG. 2. In contrast, the voltage sensor 460 differs from that employed in previous embodiments.

The current sensor 430 may be any circuit capable of sensing the current through a sensing resistor 231 or the like. This current sensor 430 may be analogous to current sensors previously disclosed or may be another type of current sensing circuit. Further, the sensor provides a current sensor voltage $V_{cs}$ that is measured between the current sensor 430 and ground. This current sensor voltage $V_{cs}$ is proportional to the output current $I_o$ times the resistance of the sensing resistor $R_{231}$. One advantage of this embodiment over the prior art is that the current sensor 430 is grounded, thus allowing a direct measurement of the current through the sensing resistor 231 without any noticeable irregularities.

The voltage sensor 460 includes first summing resistor 462 coupled to the current sensor 430 and to a second summing resistor 463 that is further coupled to the positive terminal of the load 248. An op-amp 461 receives power from a supplied voltage $V_{cc}$ and is also tied to ground. The noninverting input of the op-amp 461 is coupled between the first and second summing resistors 462, 463 and the inverting input of the op-amp 461 is coupled to a scaling resistor 465 that is coupled to the negative terminal of the load 248. A feedback resistor 464 is coupled between the inverting input and the output of the op-amp 461 to provide negative feedback.

The operation of the circuit can be expressed as follows.

Given $R_{462}=R_{463}$ and $R_{464}=R_{465}$ $V_{cs}=I_o*R_{231}$, then:

$G_{461}=1+(R_{464}/R_{465})=2$ $V_{461}=V_{ref}=V_{ol}+V_{cs}$, therefore, $V_{ol}=V_{ref}-I_o*R_{231}$ where:

$R_{462}$=resistance of first summing resistor 462 (Ω)

$R_{463}$=resistance of second summing resistor 463 (Ω)

$R_{464}$=resistance of scaling resistor 464 (Ω)

$R_{465}$=resistance of feedback resistor 465 (Ω)

$G_{461}$=gain of the op-amp 461.

The voltage $V_{461}$ of the op-amp 461 is the sum of the remote load output voltage $V_{ol}$ plus the voltage $V_{cs}$ of the current sensor 430 as seen through the summing resistors 462, 463. By way of the controller 270, the voltage $V_{461}$ of the op-amp 461 is further regulated to be equal to the reference voltage $V_{ref}$. Therefore, the voltage at the remote load is effectively removed from being a function of the unknown line impedances 242, 244.

Figure 5:
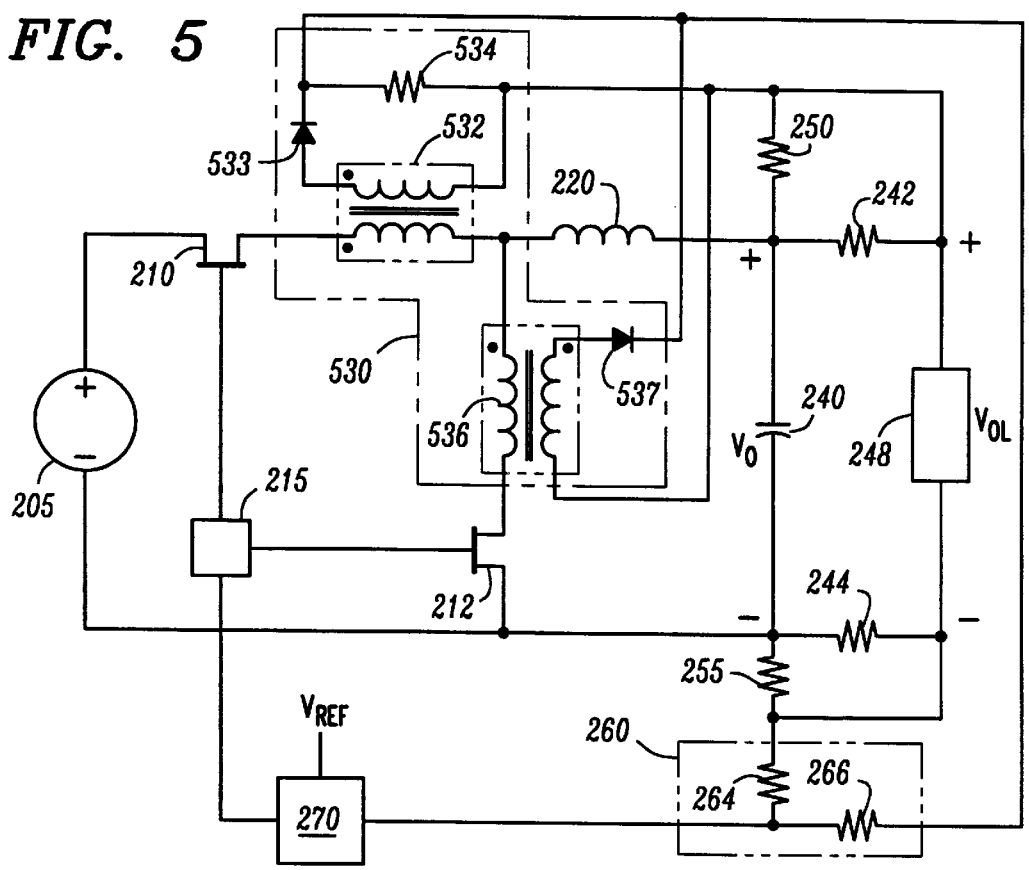
FIG. 5 illustrates a schematic diagram of the regulator of FIG. 2 employing yet another embodiment of a voltage positioning system constructed according to the principles of the present invention.

Turning now to FIG. 5, illustrated is a schematic diagram of the regulator of FIG. 2 employing yet another embodiment of a voltage positioning system constructed according to the principles of the present invention. The voltage positioning system employs a voltage sensor 260 and controller 270 in this embodiment that are, with some exceptions, analogous to those specified in FIG. 2. In contrast, the current sensor 530 differs from that utilized in previous embodiments.

The current sensor 530 includes first and second current sensing transformers 532, 536, whose primary windings are coupled in series with the first and second switches 210, 212, respectively. The secondary windings of the first and second transformers 532, 536 are Orred and coupled to one another in parallel. First and second rectifying diodes 533, 537 are coupled to the secondary windings, respectively, to rectify the currents in the windings. Finally, a sensing resistor 534 is coupled between the first and second rectifying diodes 533, 537 and the common connection of the secondary windings of the first and second current sensing transformers 532, 536 to provide a reference voltage to the current sensor 530.

The current sensor 530 is coupled to the positive terminal of the load 248 and to the voltage sensor 260. As with the previous embodiment, the voltage sensor does not include the first voltage resistor 262, but still retains the second and third voltage resistors 264, 266.

The current sensor operates by sensing the currents of the first and second switches 210, 212. When the first switch 210 is active, its current $I_{210}$ flows through the primary winding of the first transformer 532 and causes a resulting current to flow the secondary winding of the first transformer 532. This secondary winding current can be characterized as $I_{210}/N$, where N is equal to the turns ratio of the transformer. The current $I_{210}/N$ then flows through the sensing resistor 534. The resulting voltage drop across the sensing resistor 534 can be characterized as $V_{534}=(I_{210}/N)*R_{534}$, where $R_{534}$ is the resistance in the sensing resistor 534.

When the second switch 212 is active, its current $I_{212}$ flows through the primary winding of the first transformer 536 and causes a resulting current to flow the secondary winding of the second transformer 536. The second transformer reacts in a fashion similar to the first transformer. The current flowing through the secondary winding of the second transformer 536 is likewise characterized as $I_{212}/N$, where N is equal to the turns ratio of the second transformer 536 and is equal to the turns ratio in the first transformer 532. As with the first transformer 532 the current $I_{212}/N$ then flows through the sensing resistor 534. The resulting voltage drop across the sensing resistor 534 can be characterized as $V_{534}=(I_{212}/N)*R_{534}$. Since both switches are active at the different times during a duty cycle, the total voltage drop across the sensing resistor for a full duty cycle is $V_{534}=(I_{212}/N)*R_{534}+(I_{210}/N)*R_{534}=R_{534}*[(I_{212}/N)+(I_{210}/N)]$. The sum of the currents flowing from the secondary windings of the transformer 532, 536 during a switching cycle is equal to the total current flowing through the inductor for the cycle (e.g., $I_I=[(I_{212}/N)+(I_{210}/N)]=I_o/N$).

Figure 6:
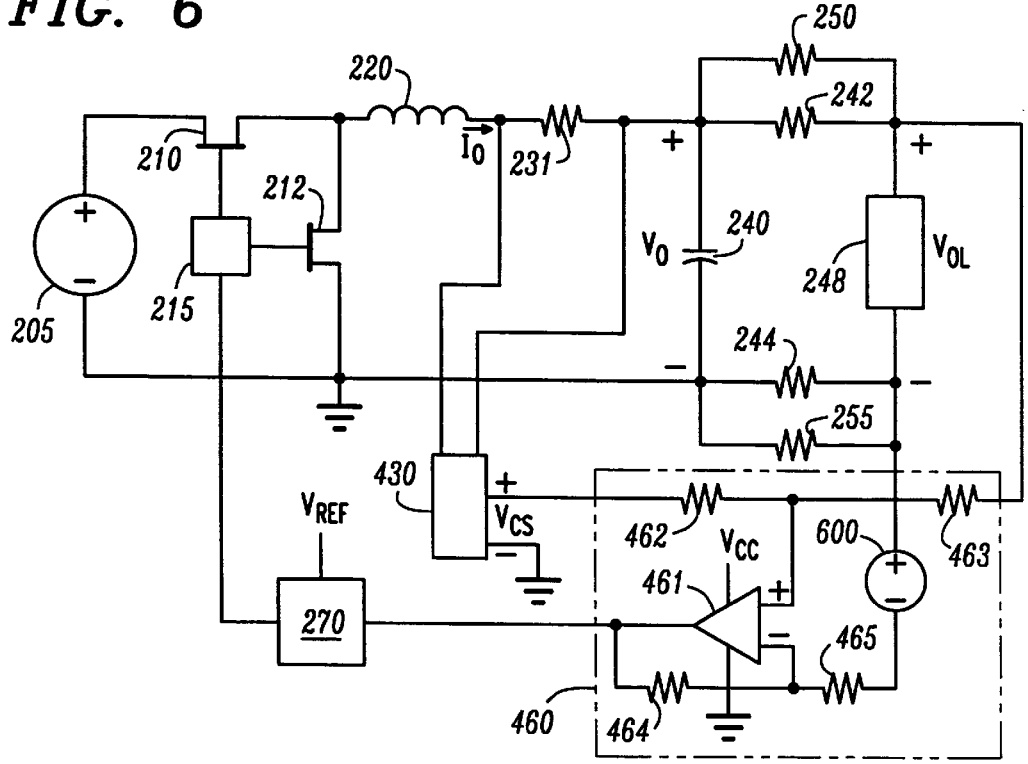
FIG. 6 illustrates a schematic diagram of the regulator of FIG. 2 employing a further embodiment of a voltage positioning system constructed according to the principles of the present invention.

Turning now to FIG. 6, illustrated is a schematic diagram of the regulator of FIG. 2 employing yet another embodiment of a voltage positioning system constructed according to the principles of the present invention. The voltage positioning system employs a current sensor 430 and controller 270 that are, with some exceptions, analogous to those specified in FIG. 2. Additionally, the voltage sensor 460 is similar to that shown is FIG. 4.

The voltage sensor 460 includes the op-amp 461 and the resistors 462, 463, 464, 465 shown in FIG. 4 and further employs an additional adjustable voltage source 600 that supplies an offset voltage $V_{off}$. This adjustable voltage source 600 functions to offset the sum of the load output voltage $V_{ol}$ plus the current sensor voltage $V_{cs}$ by the offset voltage $V_{off}$.

The operation of the circuit can be expressed as follows.

Given:

$V_{461}=V_{ol}+V_{cs}-V_{off}$, $V_{461}=V_{ref}$

Therefore:

$V_{ol}=V_{ref}-V_{cs}+V_{off}$

When $I_o=0$, $V_{cs}=0$ $V_{ol}=V_{ref}+V_{off}$

Where: $V_{461}$=the output voltage of the op-amp 461. Therefore, the offset voltage actually offsets $V_{off}$ the output load voltage $V_{ol}$ by the value of the offset voltage $V_{off}$.

An example of the the use of the offset voltage occurs where the reference voltage $V_{ref}$=2V and the requirements allow the output load voltage $V_{ol}$ may be between 1.940V to 2.060V. With the offset voltage $V_{off}$ set to 35 mV, the output load voltage $V_{ol}$ equals 2.035V. If the current sensor voltage $V_{cs}$ for a maximum current is 60 mV, then the output load voltage $V_{ol}$ will be:

$V_{ol}(I_o=Imax)=V_{ol}(I_o=0)-60\ mV=2.035-0.06=1.975V$

Thus, the offset voltage $V_{off}$ is used to tune set the output load voltage $V_{ol}$ at no load conditions.

While specific embodiments of a voltage positioning system have been illustrated and described, other embodiments are well within the broad scope of the present invention. Additionally, any regulator including linear or switched-mode topologies are well within the broad scope of the present invention.

Although the present invention has been described in detail, those skilled in the art should understand that they can make various changes, substitutions and alterations herein without departing from the spirit and scope of the invention in its broadest form.

What is claimed is:

1. For use with a regulator having an input coupled to a switching network and an output coupled to a load, a voltage positioning system, comprising:

a current sensor, coupled to said output, that senses an output current of said regulator and generates a proportional voltage;

a voltage sensor, coupled to said load, that senses a load voltage and said proportional voltage; and a controller, coupled to said voltage sensor, that generates a signal to control said switching network as a function of said load voltage and said proportional voltage.

2. The system as recited in claim 1 wherein said current sensor comprises:

an inline resistor coupled in series with said output;

an operational amplifier coupled to said inline resistor and having noninverting and inverting inputs; and first and second scaling resistors coupled to said noninverting and inverting inputs, respectively.

3. The system as recited in claim 1 wherein said switching network comprises first and second switches and said current sensor comprises first and second current transformers coupled to said first and second switches, respectively.

4. The system as recited in claim 1 wherein said voltage sensor comprises a voltage divider network coupled to said current sensor and said controller.

5. The system as recited in claim 1 wherein said voltage sensor comprises:

a plurality of summing resistors coupled to said load and said current sensor; and an operational amplifier coupled to said plurality of summing resistors and said controller.

6. The system as recited in claim 1 wherein said load is coupled to said output via a pair of conductors having corresponding impedances associated therewith.

7. The system as recited in claim 1 wherein said switching network comprises a switch selected from the group consisting of:

a controllable switch, and a diode.

8. The system as recited in claim 1 wherein said regulator is a selected from the group consisting of:

a linear regulator, and a switched-mode regulator.

9. For use with a regulator having an input coupled to a switching network and an output coupled to a load, a method of voltage positioning said regulator, comprising:

sensing an output current of said regulator and generating a proportional voltage;

sensing a load voltage and said proportional voltage; and generating a signal to control said switching network as a function of said load voltage and said proportional voltage.

10. The method as recited in claim 9 wherein sensing an output current is performed by a current sensor comprising:

an inline resistor coupled in series with said output;

an operational amplifier coupled to said inline resistor and having noninverting and inverting inputs; and first and second scaling resistors coupled to said noninverting and inverting inputs, respectively.

11. The method as recited in claim 9 wherein said switching network comprises first and second switches and said sensing said output current is performed by a current sensor comprising first and second current transformers coupled to said first and second switches, respectively.

12. The method as recited in claim 9 wherein said sensing said load voltage is performed by a voltage sensor comprising a voltage divider network coupled to said load.

13. The method as recited in claim 9 wherein said sensing said load voltage is performed by a voltage sensor comprising:

a plurality of summing resistors coupled to said load and said current sensor; and an operational amplifier coupled to said plurality of summing resistors and said controller.

14. The method as recited in claim 9 wherein said load is coupled to said output via a pair of conductors having corresponding impedances associated therewith.

15. The method as recited in claim 9 wherein said switching network comprises a switch selected from the group consisting of:

a controllable switch, and a diode.

16. The method as recited in claim 9 wherein said regulator is a selected from the group consisting of:

a linear regulator, and a switched-mode regulator.

17. A regulator having an input and an output coupled to a load, comprising:

a switching network coupled to said input, a filter coupled to said output, and a voltage positioning system, comprising:

a current sensor, coupled to said output, that senses an output current of said regulator and generates a proportional voltage;

a voltage sensor, coupled to said load, that senses a load voltage and said proportional voltage; and a controller, coupled to said voltage sensor, that generates a signal to control said switching network as a function of said load voltage and said proportional voltage.

18. The regulator as recited in claim 17 wherein said current sensor comprises:

an inline resistor coupled in series with said output;

an operational amplifier coupled to said inline resistor and having noninverting and inverting inputs; and first and second scaling resistors coupled to said noninverting and inverting inputs, respectively.

19. The regulator as recited in claim 17 wherein said switching network comprises first and second switches and said current sensor comprises first and second current transformers coupled to said first and second switches, respectively.

20. The regulator as recited in claim 17 wherein said voltage sensor comprises a voltage divider network coupled to said current sensor and said controller.

21. The regulator as recited in claim 17 wherein said voltage sensor comprises:

a plurality of summing resistors coupled to said load and said current sensor; and an operational amplifier coupled to said plurality of summing resistors and said controller.

22. The regulator as recited in claim 17 wherein said load is coupled to said output via a pair of conductors having corresponding impedances associated therewith.

23. The regulator as recited in claim 17 wherein said switching network comprises a switch selected from the group consisting of:

a controllable switch, and a diode.

24. The regulator as recited in claim 17 wherein said regulator is a selected from the group consisting of:

a linear regulator, and a switched-mode regulator.

* * * * *